United States Patent
Ranck Fields

(10) Patent No.: US 9,190,035 B1
(45) Date of Patent: Nov. 17, 2015

(54) STRING INSTRUMENT BOW GUIDE

(71) Applicant: Rebecca A. Ranck Fields, Butler, OH (US)

(72) Inventor: Rebecca A. Ranck Fields, Butler, OH (US)

( * ) Notice: Subject to any disclaimer, the term of this patent is extended or adjusted under 35 U.S.C. 154(b) by 0 days.

(21) Appl. No.: 14/661,358

(22) Filed: Mar. 18, 2015

(51) Int. Cl.
| | |
|---|---|
| *G10D 3/16* | (2006.01) |
| *G10D 3/00* | (2006.01) |
| *G10D 3/18* | (2006.01) |
| *G10D 1/02* | (2006.01) |
| *G09B 15/00* | (2006.01) |
| *G09B 15/02* | (2006.01) |
| *G09B 15/06* | (2006.01) |

(52) U.S. Cl.
CPC ............... *G10D 3/166* (2013.01); *G09B 15/00* (2013.01); *G09B 15/06* (2013.01); *G10D 1/02* (2013.01); *G10D 3/00* (2013.01); *G10D 3/16* (2013.01); *G10D 3/163* (2013.01); *G10D 3/18* (2013.01)

(58) Field of Classification Search
CPC ........... G10D 3/00; G10D 3/16; G10D 3/163; G10D 3/166; G10D 3/18; G09B 15/00; G09B 15/06
USPC ................. 84/325, 283, 281, 470 R; 984/122; D17/20
See application file for complete search history.

(56) References Cited

U.S. PATENT DOCUMENTS

| | | | | |
|---|---|---|---|---|
| 766,549 | A * | 8/1904 | Strauss et al. ......... | G10D 3/166 84/283 |
| 1,192,030 | A * | 7/1916 | Ashley ................... | G10D 3/166 84/283 |
| 1,353,036 | A * | 9/1920 | Fisher .................... | G10D 3/166 84/283 |
| 1,603,371 | A * | 10/1926 | Zahn ...................... | G10D 3/166 84/283 |
| 1,623,633 | A * | 4/1927 | Morris ................... | G10D 3/166 84/283 |
| 1,723,266 | A * | 8/1929 | Caruso .................. | G10D 3/166 84/283 |
| 1,788,700 | A * | 1/1931 | Battams ................ | G10D 3/166 84/283 |
| 1,789,210 | A * | 1/1931 | Konrad Auensen Peder ..................... | G10D 3/166 84/283 |
| 2,240,696 | A * | 5/1941 | Gusman ................ | G09B 15/06 84/281 |
| 2,782,670 | A * | 2/1957 | Lipski ................... | G10D 3/166 84/283 |

(Continued)

*Primary Examiner* — Elvin G Enad
*Assistant Examiner* — Christina Schreiber
(74) *Attorney, Agent, or Firm* — Crossley Patent Law

(57) ABSTRACT

A string instrument bow guide that selectively fits a bow played string instrument without being fastened to the string instrument. The guide has two arc shaped inserts that may be made of a flexible material and that removably fit within a pair of opposed bouts. A pair of holes is provided in each insert for selective fit of a pair of memory strands that arch above a highway of the strings. A range of desired spacing above the strings is provided by both an insert thickness of the inserts relative to a depth of the bouts and also by a selective fit of the strands within the inserts. The bow guide is selectively disassembled or collapsed to fit within a case of the string instrument.

13 Claims, 7 Drawing Sheets

(56) References Cited

U.S. PATENT DOCUMENTS

| | | | | |
|---|---|---|---|---|
| 3,107,568 A | * | 10/1963 | La Porte | G10D 3/166 84/283 |
| 3,169,438 A | * | 2/1965 | Belcher | G10D 3/166 84/283 |
| 3,306,150 A | * | 2/1967 | Phillips | G10D 3/166 84/283 |
| 3,726,175 A | * | 4/1973 | Kaplan | G09B 15/06 84/281 |
| D239,406 S | * | 3/1976 | Gordon | D17/20 |
| 3,987,700 A | * | 10/1976 | Dunlap | G10D 3/166 84/283 |
| 4,222,302 A | * | 9/1980 | Sanfilippo | G10D 3/166 84/283 |
| 4,854,212 A | * | 8/1989 | Levin | G10D 3/166 84/283 |
| D322,270 S | * | 12/1991 | Concoff | 84/283 |
| 5,301,589 A | * | 4/1994 | Spadafora et al. | G10D 3/166 84/283 |
| D563,456 S | * | 3/2008 | Plummer | D17/20 |
| 7,605,317 B2 | * | 10/2009 | Chen | G09B 15/06 84/281 |
| 8,507,779 B1 | * | 8/2013 | Chen | G09B 15/00 84/470 R |
| 2004/0237751 A1 | * | 12/2004 | Foxwell | G10D 3/166 84/283 |
| 2006/0278063 A1 | * | 12/2006 | Liao | G09B 15/06 84/465 |

* cited by examiner

STRING INSTRUMENT BOW GUIDE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of bow guides for a variety of bow played string instruments are known in the prior art. Some are quite complex. Some must be fastened to the string instrument, a trait that is undesirable for several reasons. As example, fastening a bow guide to the string instrument may physically damage the string instrument. Fastening the guide to the string instrument also typically significantly alters tone values. And, fastening the guide to an string instrument is time consuming in both fastening and unfastening as needed. What is needed is a string instrument bow guide that selectively fits a string instrument quickly, without being fastened to the string instrument. What is further needed is a bow guide that does not harm the string instrument in any way or significantly alters the tone of the string instrument. And, a bow guide is needed that provides a somewhat universal fit to a class of string instruments. Further, a bow guide is needed that is selectively wholly or partly disassembled with ease. Also, a bow guide is needed that is selectively fitted within a string instrument case and therein be carried along with the string instrument rather than separately. The present string instrument bow guide provides all of the advantages.

FIELD OF THE INVENTION

The present invention relates to teaching aids for bow played string instruments, and more particularly, to a string instrument bow guide that is removably fitted, without fastening, within the bouts of the string instrument wherein a player's bow is guided over a desired area only of the strings.

SUMMARY OF THE INVENTION

The general purpose of the present string instrument bow guide, described subsequently in greater detail, is to provide a string instrument bow guide which has many novel features that result in a string instrument bow guide which is not anticipated, rendered obvious, suggested, or even implied by prior art, either alone or in combination thereof.

To accomplish this, the string instrument bow guide includes an arc shaped first insert and an arc shaped second insert. Each of the first insert and second insert has an interior face and an exterior face spaced apart from the interior face. Each of the first insert and the second insert has a top side and a bottom side spaced apart from the top side by an insert thickness. Each of the first insert and second insert is selectively fitted to one of a pair of bouts in a string instrument. The insert thickness is selectively less than a bout depth of the bouts wherein the first insert and second insert are positioned as desired within the bout depth, therein allowing up and down adjustment in relation to a bridge height of the instrument.

An E string cutout is disposed in the second insert wherein the second insert is configured to provide an interference free draw of a bow across the E string. A pair of spaced apart holes is disposed in the top side. The holes disposed in the top side selectively continue through the bottom side in each of the first insert and the second insert. The holes are spaced apart to locate the bow guide over a highway of the string instrument. The spaced apart holes can have a spacing in a range of approximately one-half inch up to 4 inches. The first insert and the second insert are selectively composed of a material that will not scratch or harm the string instrument. Also, a non abrading material is selectively disposed on the exterior face of each of the first insert and second insert.

A pair of u-shaped memory strands is provided. Each strand has an arced portion and a outer end spaced apart from the arced portion. Memory refers to the ability of the strands to attempt to return to an original shape when the outer ends are flexed in expansion or contraction with regard to the u-shaped strands. The memory strands are selectively unabrasive. One of each of outer ends of one of each of the pairs of memory strands is fitted into one hole of each of the first insert and the second insert, respectively, wherein the strands are parallel. A coating is selectively disposed on each of the pair of memory strands. The coating is selectively rubberized. The strands are selectively made of but are not limited to a dandoline wire, as example.

The first insert and the second insert are provided in a plurality of sizes and curvatures wherein any number of a variety of sizes and shapes of bouts of a variety of string instruments played with a bow are accommodated. Such string instruments include, in all sizes, but are not limited to a violin, a viola, a cello, and a bass. In each application, the memory strands tension the first insert toward the second insert to be selectively held within the bouts and above the highway of the string instrument. The memory strands are also provided as one continuous strand that is first fitted through mirror image holes in first and second inserts, then through the remaining holes in the first and second inserts.

As the insert thickness of each of the first insert and second insert is selectively designed to be less than the bout depth of the variety of string instruments, and as a depth of the holes selectively varies, the strands are selectively supported at a desired distance above the highway. In some applications, this desired distance above the highway is in an range of ¼ inch to ¾ inch, but is not relegated to that distance.

The bow guide is an ideal tool for teaching a student to guide the bow over the area of the strings known as the highway, even Kreisler highway by some. This highway is typically over an area of what are known as f holes within the string instrument. The bow guide is also selectively used to correct an advanced player with bow placement.

Thus has been broadly outlined the more important features of the present string instrument bow guide so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
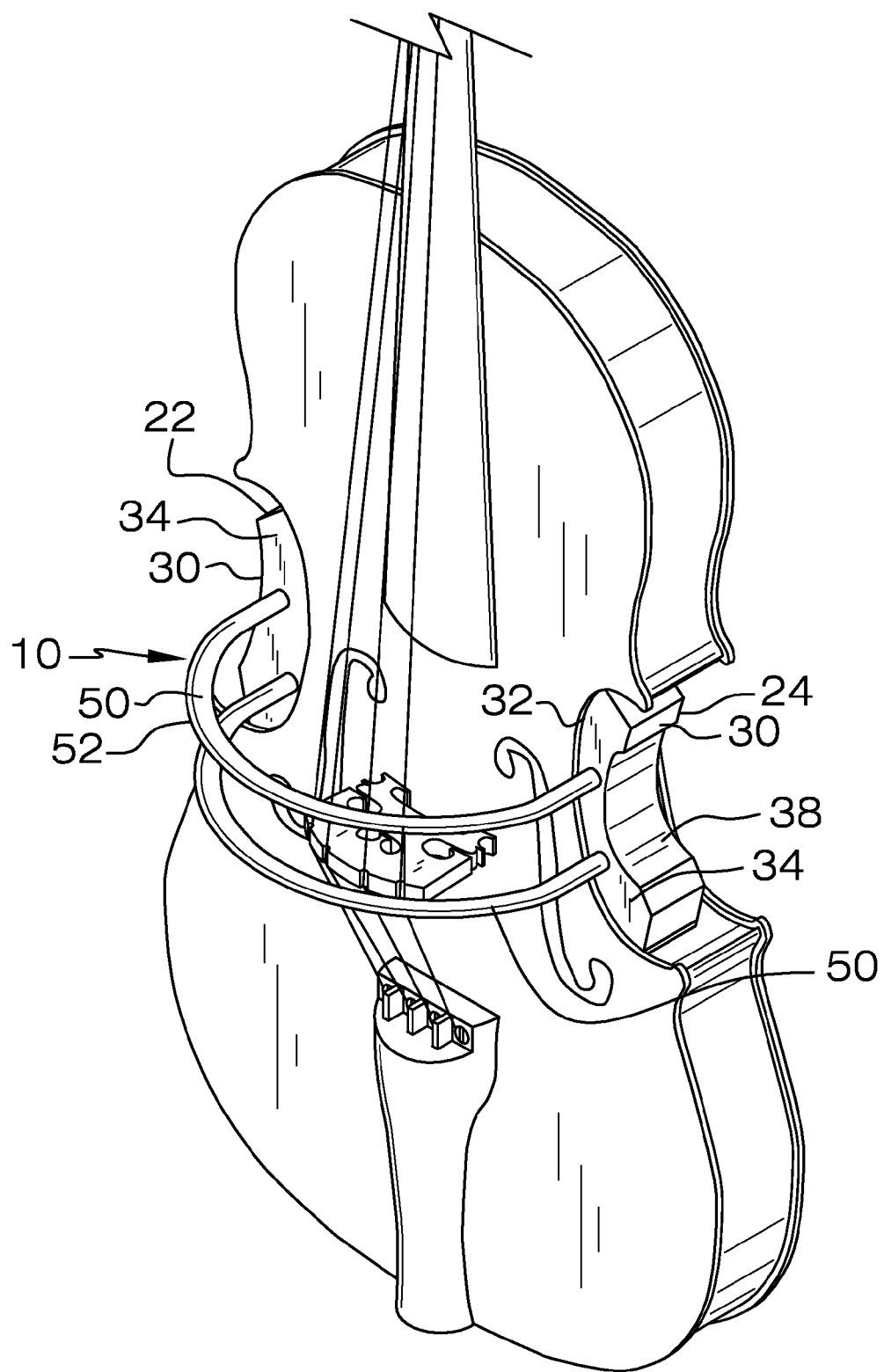
FIG. 1 is a perspective in use view.
Figure 2:
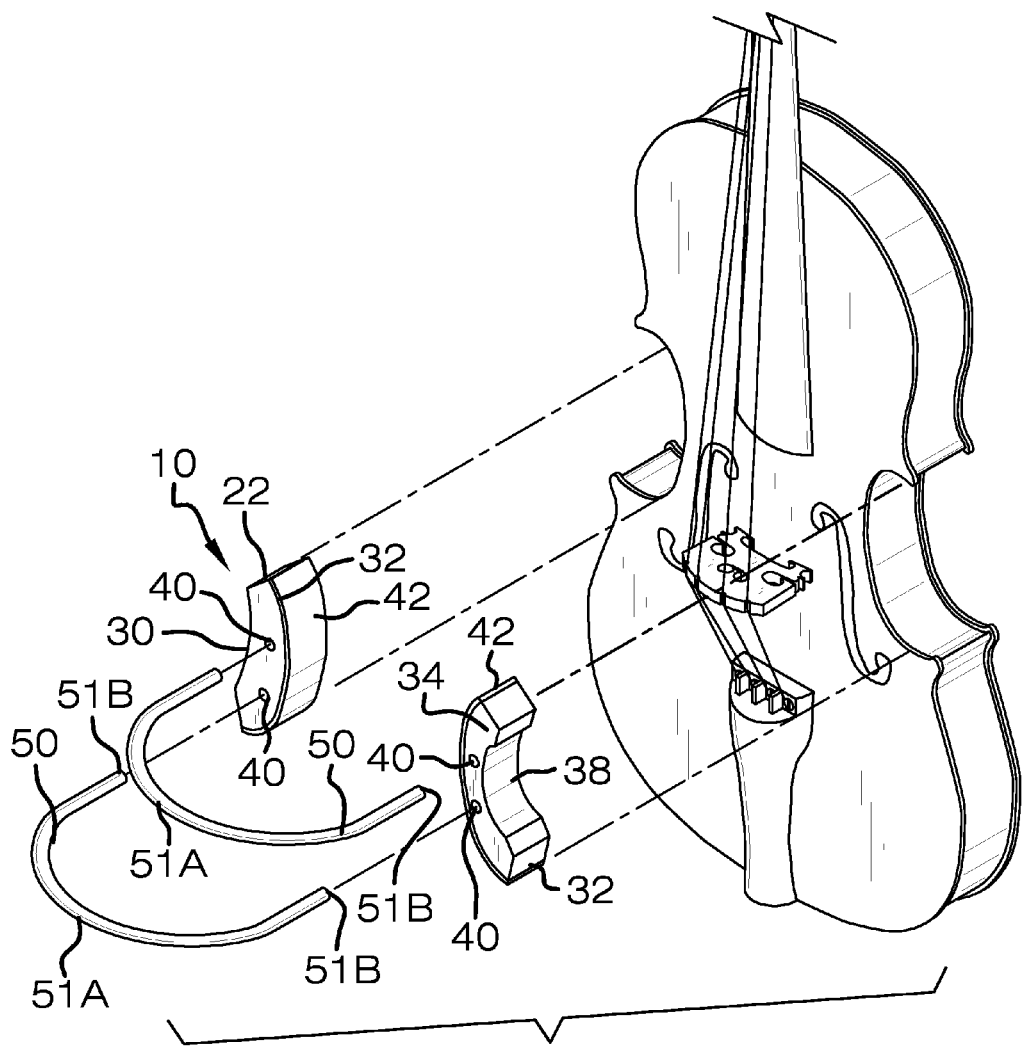
FIG. 2 is an exploded view.
Figure 3:
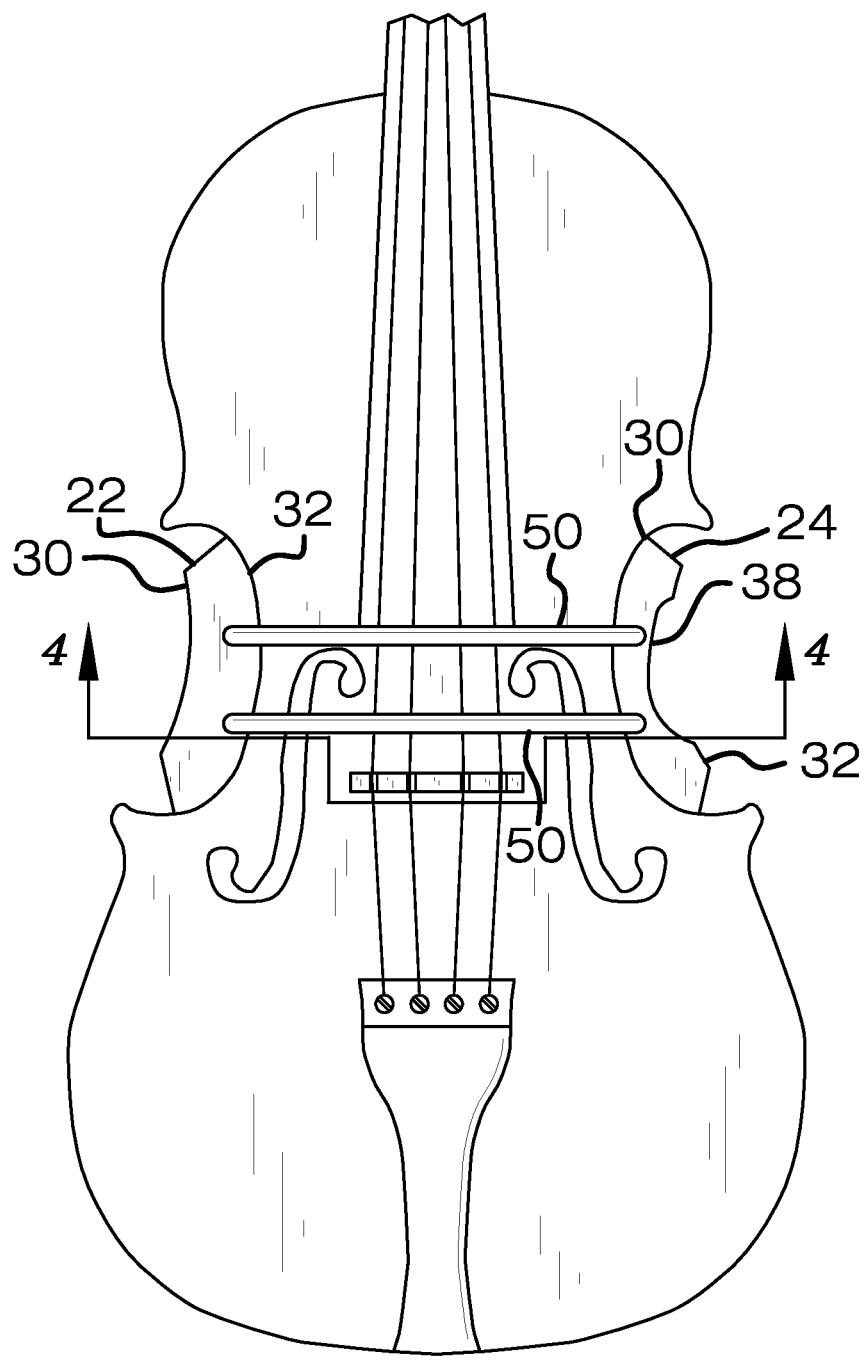
FIG. 3 is a top plan in use view.
Figure 4:
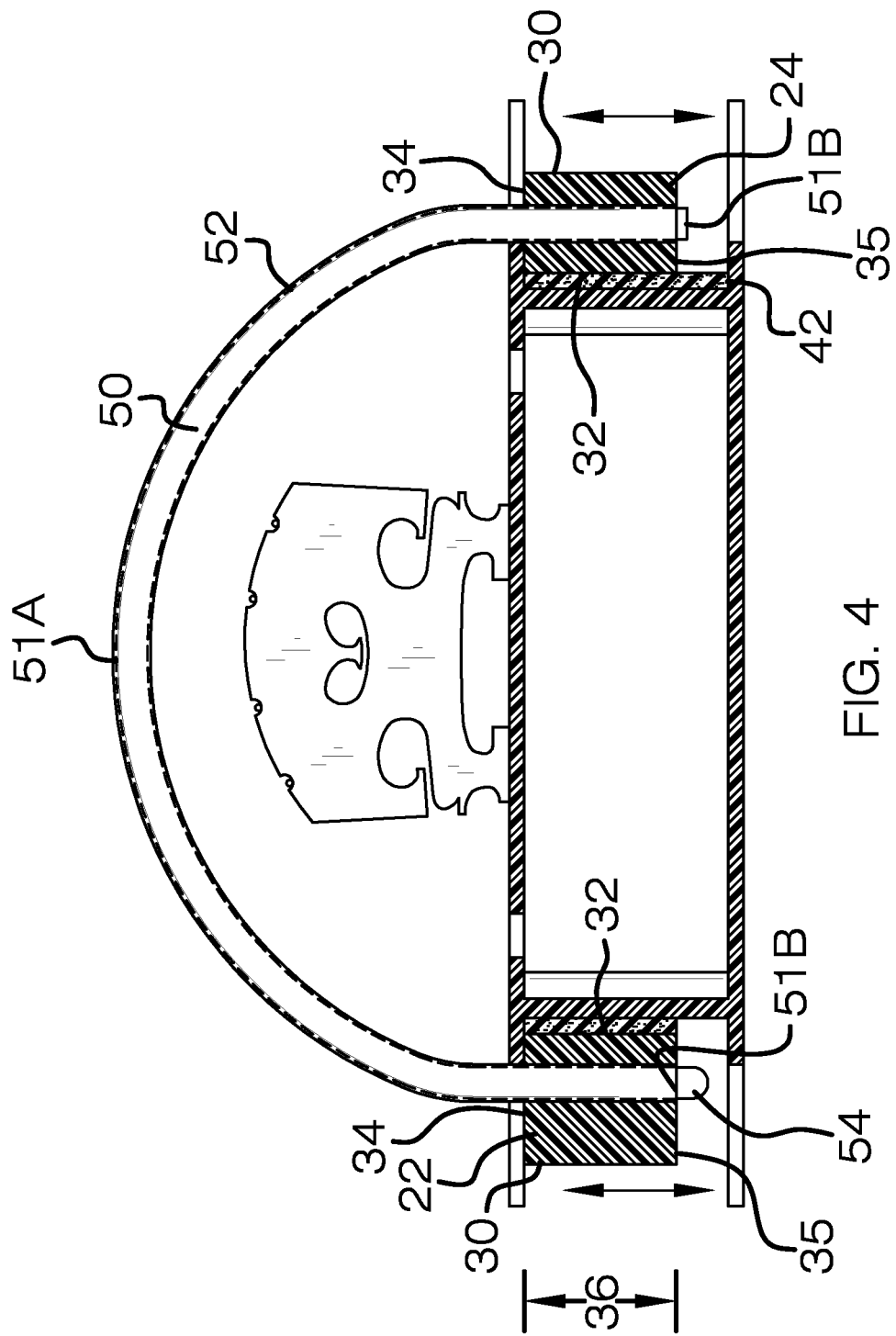
FIG. 4 is a cross sectional view of FIG. 3 taken along the line 4-4.
Figure 5:
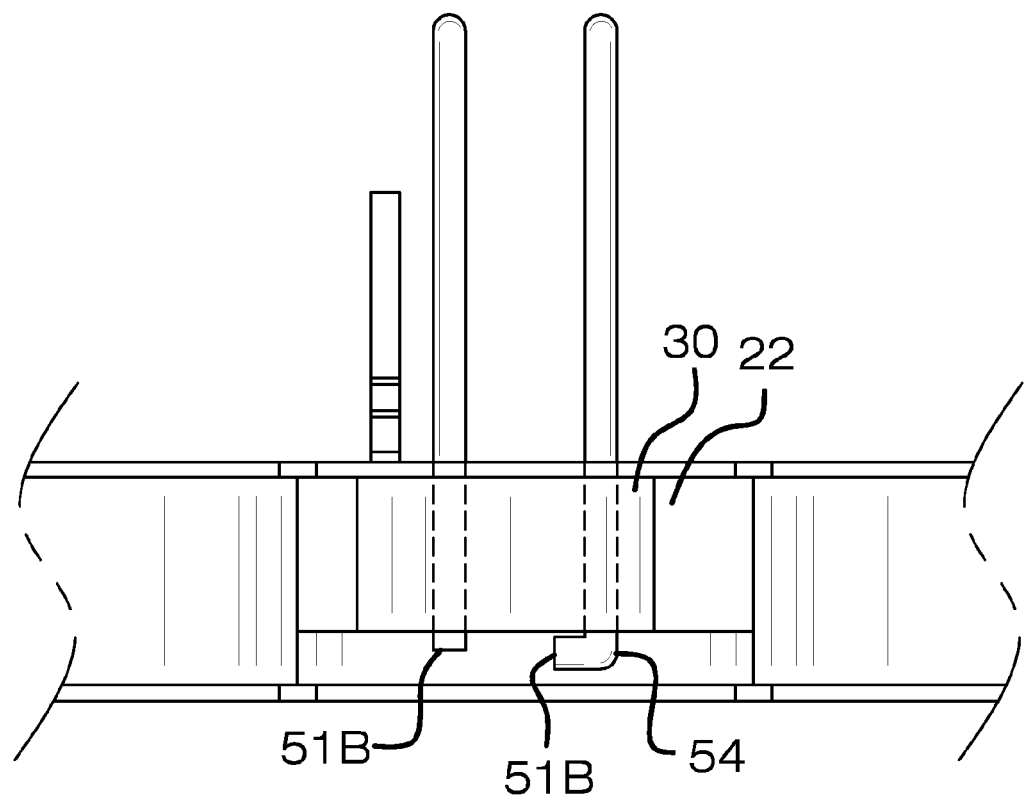
FIG. 5 is a lateral elevation in use view.
Figure 5A:
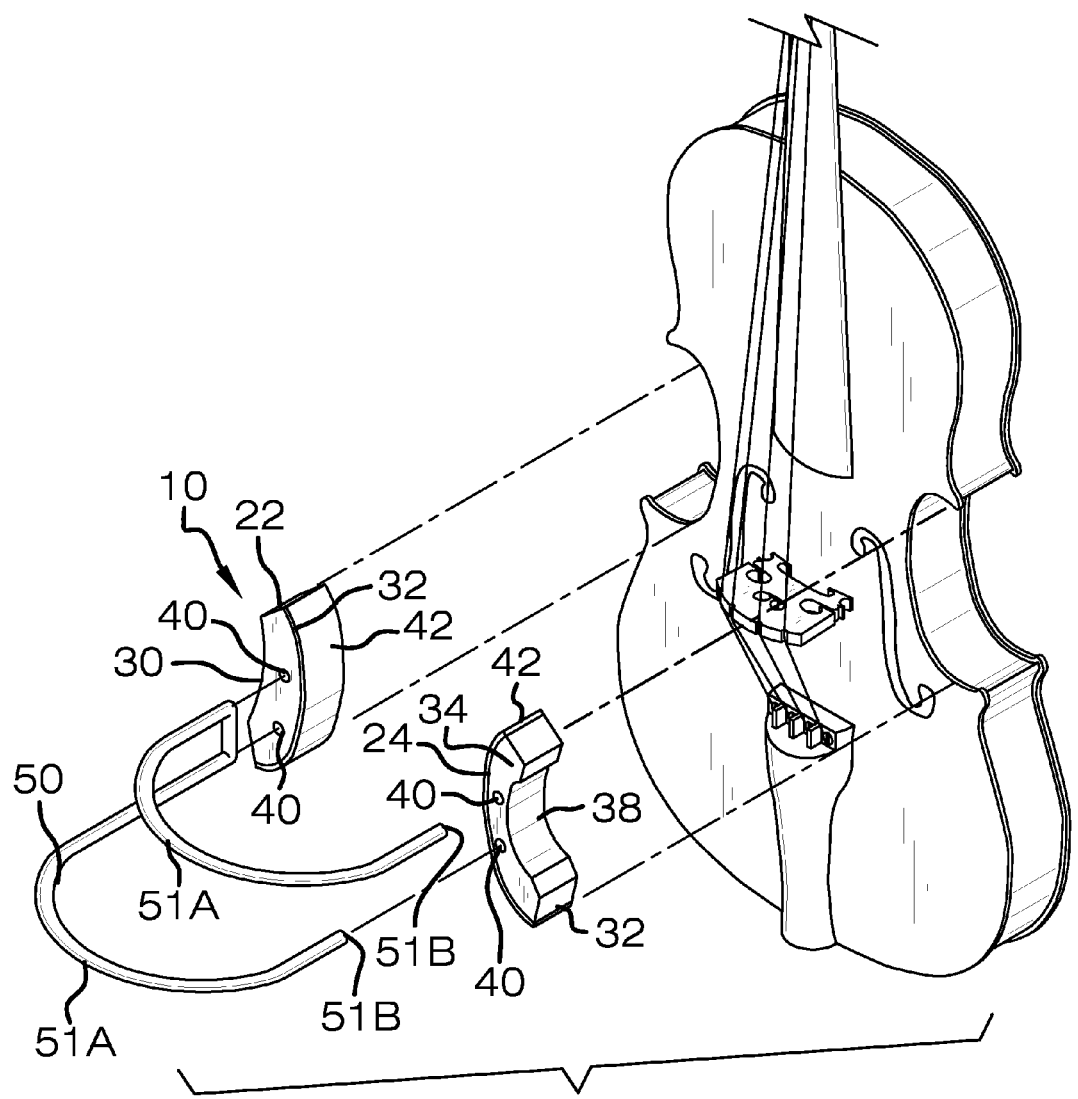
FIG. 5A is an exploded view having a continuous strand.
Figure 5B:
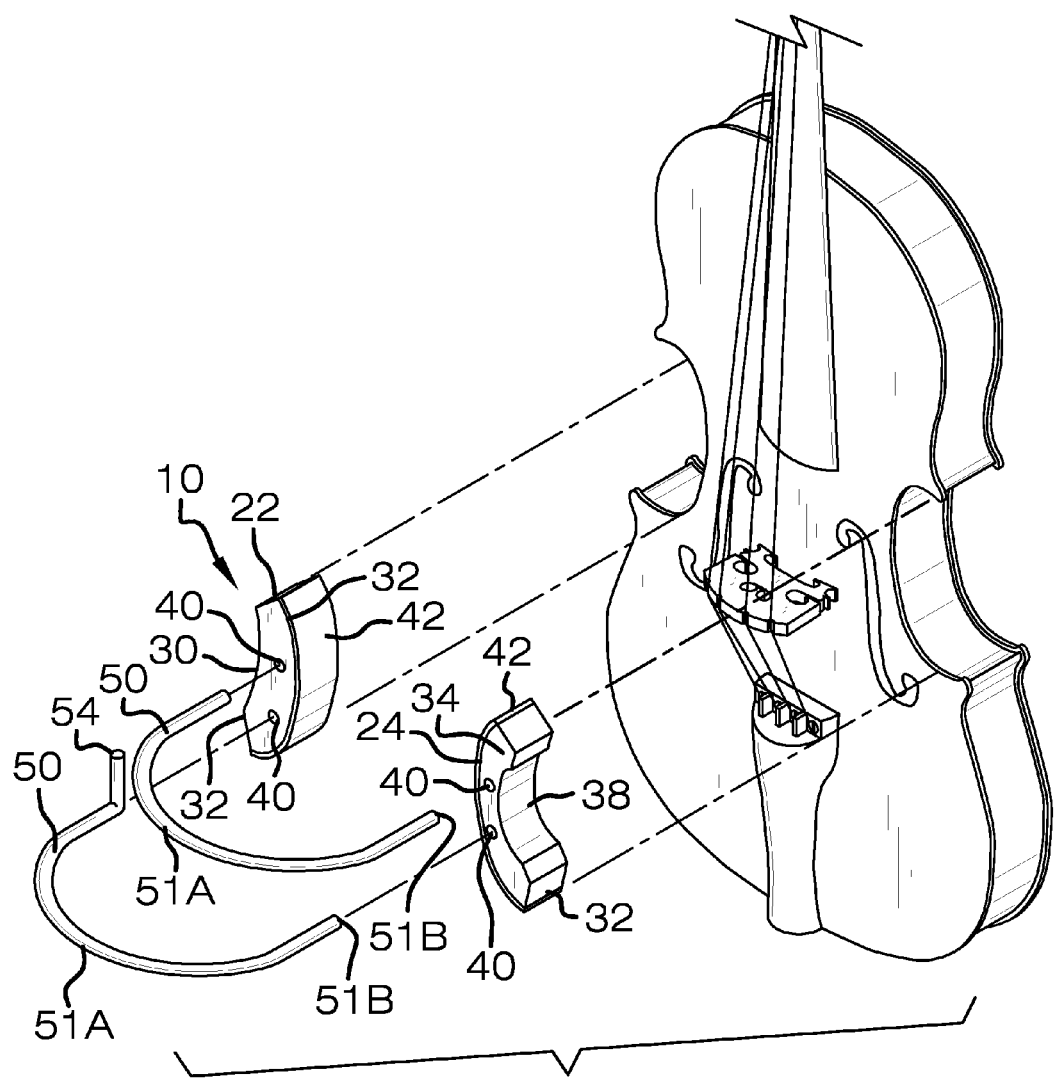
FIG. 5B is an exploded view having a right angled retainer on a strand.

With reference now to the drawings, and in particular FIGS. 1 through 5B thereof, an example of the string instrument bow guide employing the principles and concepts of the present string instrument bow guide and generally designated by the reference number 10 will be described.

Referring to FIGS. 1 through 5B the present string instrument bow guide 10 is illustrated. The string instrument bow guide 10 includes an arc shaped first insert 22 and an arc shaped second insert 24. Each of the first insert 22 and second insert 24 has an interior face 30 and an exterior face 32 spaced apart from the interior face 30. Each of the first insert 22 and the second insert 24 has a top side 34 and a bottom side 35 spaced apart from the top side 34 by an insert thickness 36. Each of the exterior faces 32 is selectively fitted to one of a pair of bouts in a string instrument. The insert thickness 36 is selectively less than a bout depth of the bouts wherein the first insert 22 and second insert 24 are positioned as desired within the bout depths. The first insert 22 and second insert 24 are selectively made of a flexible composition that conforms to a variety of sizes and shapes of bouts. The first insert 22 and second insert 24 are also selectively made of an inflexible material. Both the flexible and inflexible material is selectively non abrading material 42. The exterior faces 32 are also selectively lined with a non abrading material 42 which is selectively rubberized wherein the first insert 22 and second insert 24 most easily conform to and do not damage the string instrument.

An E string cutout 38 is selectively disposed in the second insert 24 wherein the second insert is configured to provide an interference free draw of a bow across the E string of the string instrument. The second insert 24 also selectively has a width such that a cutout 38 is selectively omitted. A pair of spaced apart holes 40 is disposed in the top side 34. The holes 40 disposed in the top side 34 also selectively continue through the bottom side 35 in each of the first insert 22 and the second insert 24.

A pair of u-shaped memory strands 50 is provided. Each strand 50 has an arced portion 51A and an outer end 51B spaced apart from the arced portion 51A. The memory strands 50 are selectively unabrasive. One of each of the outer ends 51B of one of each of the pairs of strands 50 is pivotally and removably fitted into one hole 40 of each of the first insert 22 and second insert 24, respectively, wherein the strands 50 are parallel. The spaced apart configuration of the holes 40 is configured to locate the strands 50 over a highway of the string instrument. The strands 50 are selectively combined to form one continuous strand 50.

A coating 52 is selectively disposed on each of the pair of memory strands 50. The coating 52 is selectively rubberized. At least one of the pair of memory strands 50 selectively has a right angled retainer 54 disposed on at least one of the outer ends 51B such that the right angled retainer 54 is configured to prevent removal of the outer end 51B from at least one of the first insert 22 and the second insert 24.

The first insert 22 and the second insert 24 are provided in a plurality of sizes and curvatures wherein any number of a variety of sizes and shapes of bouts of a variety of string instruments played with a bow are accommodated. Such string instruments include, in all sizes, but are not limited to a violin, a viola, a cello, a bass, and such. In each application, the memory strands 50 tension the first insert 22 toward the second insert 24 to be selectively held within the bouts.

As the insert thickness 36 of each of the first insert 22 and second insert 24 is selectively designed to be less than the bout depth of the variety of string instruments, and as a penetration of the outer ends 51B into the holes 40 selectively varies, the strands 50 are selectively supported at a desired distance above the highway. In some applications, this desired distance is selectively in a range of ¼ inch to ¾ inch, but is not relegated to that distance.

What is claimed is:

1. A string instrument bow guide comprising:
   an arc shaped first insert and an arc shaped second insert, each of the first and second inserts having an interior face and an exterior face spaced apart from the interior face, a top side and a bottom side spaced apart from the top side by an insert thickness;
   wherein each of the first insert and the second insert is selectively fitted to one of a pair of bouts in a string instrument;
   wherein the second insert is disposed more proximal an E string of the string instrument than the first insert;
   a pair of spaced apart holes disposed through the top side and into each insert thickness; and
   a pair of u-shaped memory strands, each memory strand having an arced portion and a pair of spaced apart outer ends, one of each outer end fitted into one of the holes of each of the first insert and the second insert, respectively;
   wherein the memory strands tension the first insert toward the second insert to selectively hold the first and second inserts within the bouts;
   wherein the memory strands are parallel to each other;
   wherein the memory strands are supported above a highway of the string instrument;
   an E string cutout disposed in the second insert, wherein the second insert is configured to provide an interference free draw of a bow across the E string.

2. The string instrument bow guide of claim 1 wherein a non abrading material is disposed on the exterior face of each of the first and second inserts.

3. A string instrument bow guide comprising:
   an arc shaped first insert and an arc shaped second insert, each of the first and second inserts having an interior face and an exterior face spaced apart from the interior face, a top side and a bottom side spaced apart from the top side by an insert thickness;
   wherein each of the first insert and the second insert is selectively fitted to one of a pair of bouts in a string instrument;
   wherein the second insert is disposed more proximal an E string of the string instrument than the first insert;
   a pair of spaced apart holes disposed through the top side and into each insert thickness; and
   a pair of u-shaped memory strands, each memory strand having an arced portion and a pair of spaced apart outer ends, one of each outer end fitted into one of the holes of each of the first insert and the second insert, respectively;
   wherein the memory strands tension the first insert toward the second insert to selectively hold the first and second inserts within the bouts;
   wherein the memory strands are parallel to each other; and
   wherein the memory strands are supported above a highway of the string instrument;
   wherein the insert thickness is less than a depth of the respective bout;

an E string cutout disposed in the second insert, wherein the second insert is configured to provide an interference free draw of a bow across the E string.

4. The string instrument bow guide of claim 3 wherein a non abrading material is disposed on the exterior face of each of the first and second inserts.

5. A string instrument bow guide comprising:
- a flexible arc shaped first insert and a flexible arc shaped second insert, each of the first and the second inserts having an interior face and an exterior face spaced apart from the interior face, a top side and a bottom side spaced apart from the top side by an insert thickness;
- wherein each of the first insert and the second insert is selectively fitted to one of a pair of bouts in a string instrument;
- wherein the insert thickness is less than a depth of each of the bouts;
- an E string cutout disposed in the second insert;
- wherein the second insert is configured to provide an interference free draw of a bow across the E string
- a pair of spaced apart holes disposed from the top side through the bottom side in each insert;
- a non abrading material disposed on the exterior face of each of the first and second inserts;
- a pair of unabrasive u-shaped memory strands, each strand having an arced portion and an spaced apart outer ends spaced apart from the arced portion, one of each of the outer ends of at least one of the pair of memory strands removably and pivotally fitted into one hole of each of the first insert and the second insert, respectively;
- a rubberized coating disposed on each strand;
- wherein the memory strands tension the first insert toward the second insert to selectively hold the inserts within the bouts;
- wherein the spaced apart configuration of the holes is configured to locate the strands over a highway of the string instrument;
- wherein the memory strands are parallel to each other when the bow guide is in use; and
- wherein the strands are supported at a selected distance above the highway.

6. The string instrument guide of claim 5 wherein at least one of the strands has an angled retainer disposed on at least one of the outer ends, wherein the at least one angled retainer is configured to prevent removal of the outer end from at least one of the first insert and the second insert.

7. The string instrument bow guide of claim 5 wherein the holes in each of the first insert and the second insert are spaced apart by a spacing in a range of approximately ½ inch to 4 inches.

8. The string instrument guide of claim 7 wherein at least one of the strands has a right angled retainer disposed on at least one of the outer ends, wherein the at least one angled retainer is configured to prevent removal of the outer end from at least one of the first insert and the second insert.

9. The string instrument bow guide of claim 5 wherein the selected distance above the highway is in an range of approximately ½ inch 4 inches.

10. The string instrument guide of claim 9 wherein at least one of the strands has a right angled retainer disposed on at least one of the outer ends, wherein the at least one angled retainer is configured to prevent removal of the outer end from at least one of the first insert and the second insert.

11. The string instrument bow guide of claim 9 wherein the holes in each of the first arc and the second arc are apart by a spacing in a range of approximately ½ inch to 4 inches.

12. The string instrument guide of claim 11 wherein at least one of the strands has a right angled retainer disposed on at least one of the outer ends, wherein the at least one angled retainer is configured to prevent removal of the outer end from at least one of the first insert and the second insert.

13. The string instrument guide of claim 12 wherein the strands are combined to form one continuous strand.

* * * * *